United States Patent
Schmidt et al.

(10) Patent No.: US 7,386,229 B2
(45) Date of Patent: Jun. 10, 2008

(54) CAMERA LCD SCREEN HOOD AND VIEWING DEVICE

(75) Inventors: Louis J. Schmidt, Hermosa Beach, CA (US); Robert P. Schmidt, West Hollywood, CA (US); Michael R. Schmidt, Hermosa Beach, CA (US)

(73) Assignee: Hoodman Corporation, Torrance, CA (US)

( * ) Notice: Subject to any disclaimer, the term of this patent is extended or adjusted under 35 U.S.C. 154(b) by 0 days.

(21) Appl. No.: 11/881,931

(22) Filed: Jul. 30, 2007

(65) Prior Publication Data

US 2008/0030868 A1    Feb. 7, 2008

Related U.S. Application Data

(60) Provisional application No. 60/835,743, filed on Aug. 4, 2006.

(51) Int. Cl.
   *G03B 11/04* (2006.01)
   *G02B 21/00* (2006.01)

(52) U.S. Cl. ............ 396/534; 359/611; 359/612; 359/613; 359/643

(58) Field of Classification Search ........ 359/611–613, 359/643; 396/534
See application file for complete search history.

(56) References Cited

U.S. PATENT DOCUMENTS

| | | | | |
|---|---|---|---|---|
| 4,576,459 A | * | 3/1986 | Miura et al. | 396/534 |
| 5,166,719 A | * | 11/1992 | Chinzei et al. | 396/373 |
| 5,225,932 A | * | 7/1993 | Wannagot et al. | 359/611 |
| 5,408,359 A | * | 4/1995 | Ferrett et al. | 359/601 |
| 7,104,658 B2 | * | 9/2006 | Fischbach et al. | 359/611 |
| 2002/0097997 A1 | * | 7/2002 | Izawa | 396/287 |
| 2005/0200959 A1 | * | 9/2005 | Yamamoto | 359/600 |

* cited by examiner

*Primary Examiner*—Evelyn A. Lester
(74) *Attorney, Agent, or Firm*—Fildes & Outland, P.C.

(57) ABSTRACT

In an exemplary embodiment, an LCD screen hood is provided for use with digital cameras. The hood includes a hood tube that defines a light blocking sidewall having an open camera end and an opposite viewing end and enclosing a longitudinally extending viewpath therebetween. An eyepiece mounted on the viewing end includes an eyepiece lens for enlarging an image on an associated LCD screen disposed at the camera end of the hood tube. An eye cup is mounted on the eyepiece for shielding the eyepiece lens from ambient light. An objective tube fixed to the hood tube carries a three piece objective lens mounted between the eyepiece lens and the camera end of the hood tube. Magnification of the eyepiece lens varies as appropriate between 1× and 2.5×. Rotation of the eyepiece tube provides for diopter adjuxtment.

12 Claims, 4 Drawing Sheets

CAMERA LCD SCREEN HOOD AND VIEWING DEVICE

CROSS-REFERENCE TO RELATED APPLICATIONS

This application claims priority from U.S. Provisional Patent Application No. 60/835,743, filed Aug. 4, 2006, the entire disclosure of which is hereby incorporated herein by reference.

TECHNICAL FIELD

This invention relates to devices such as digital cameras, and more particularly to devices for viewing camera LCD view screens while also shielding the view screens to prevent glare.

BACKGROUND OF THE INVENTION

It is known in the art relating to digital cameras that an LCD screen or similar display on the digital camera is used to review captured images to check the focus, lighting, composition, expression, and other similar attributes prior to taking the next shot. The LCD screen is also used in lieu of the camera's viewfinder to view images for capture. Digital cameras are often used in outdoor settings, and glare caused by sunlight on an LCD screen severely hinders the viewing of images displayed on a digital camera LCD screen. Often, a photographer has to use one hand to awkwardly shield the camera LCD screen in order to be able to view the screen. This is cumbersome and only marginally effective, thereby detracting from the quality of the photographer's pictures and slowing the picture taking process.

SUMMARY OF THE INVENTION

The present invention provides an illuminatable screen hood, adapted for use with digital cameras with LCD screens or the like, that eliminates screen glare for improved outdoor LCD screen viewing capability. The LCD screen hood is placeable about a digital camera LCD screen to cover the LCD screen and to block the LCD screen from ambient light. The LCD screen hood also includes a lens arrangement that allows a photographer to magnify viewed images on the LCD screen, and an eye cup that allows the photographer to place his/her eye up against the hood to completely seal out light from the inside of the hood.

More particularly, a digital camera LCD screen hood in accordance with the invention includes a LCD screen cover member having an open camera end, a sidewall, and a viewing end opposite the camera end. The open camera end is generally sized to fit around a digital camera LCD screen. An eyepiece is generally disposed at the viewing end.

The eyepiece includes a lens housing. An eye cup is attached to the lens housing. The eye cup may be sized such that it is large enough to surround a human eye that is placed up to the eyepiece. At least one optical lens is disposed inside of the lens housing. In one embodiment of the invention, more than one lens is disposed in the lens housing. One or more of the lenses cooperate to magnify the image on the screen. The optical magnification provided by the lenses of the eyepiece may range from between 1× and 2.5× magnification. In one embodiment of the invention, 1.5× magnification may be the optimal magnification, although this value may vary depending on the size of the LCD screen as described in more detail below.

The eyepiece may also provide a diopter adjustment that accommodates for vision imperfections of specific users of the LCD screen hood. The diopter adjustment may be performed by rotating the lens housing relative to the sidewall of the hood. For example, the lens housing may have a threaded surface that can be screwed into and out of the hood. In one embodiment of the invention, the eyepiece may provide a plus or minus three (+/−3) diopter adjustment.

The digital camera LCD screen hood may be placeable about a digital camera's LCD screen. For example, a user may grip the sidewall of the LCD screen hood and hold the camera end of the LCD screen hood up against the periphery of the camera LCD screen. Once the LCD screen hood is placed about the LCD screen, a user may place his or her eye up to the eyepiece to view the shielded LCD screen. Alternatively, the LCD screen hood could be modified for attachment about the LCD screen with any suitable mounting means, for example, by mounting on a protective cap projecting outward around the screen.

The length from the camera end of the hood to the viewing end of the hood, and hence the distance of a user's eye from the eyepiece to the LCD screen, is for practical reasons preferably less than seven inches. Hoods that are larger than seven inches in length are less convenient to use. Because the human eye has difficulty focusing on objects that are less than seven inches from the eye, the lens or multiple lenses of the eyepiece magnify and focus the image of the LCD screen on the user's eye at distances of five inches or less. This in turn allows the LCD screen hood to be designed to have a length from the camera end to the viewing end of approximately five inches or less.

The lens arrangement of the eyepiece also prevents over-magnification of the LCD screen. If the LCD screen were to be over-magnified, the user would undesirably see only dots (the pixels of the screen) instead of a coherent image. It can therefore be seen that the optimal magnification of the LCD screen hood depends upon the size of the LCD screen (i.e., the size/number of pixels).

In a specific embodiment, an LCD screen hood in accordance with the invention includes a hood tube that generally defines a sidewall of the device. The hood tube has an open camera end and an opposite viewing end. A rubber cushion may be connected to the periphery of the camera end and a rubber grip may be connected to an outer surface of the hood tube. The rubber cushion reduces the possibility of scratching an LCD screen when the camera end is placed about the LCD screen. The rubber grip aides a user in gripping and holding the device. A lanyard may also be connected to the outer surface of the hood tube to allow a user to conveniently carry the device.

The LCD screen hood also includes an eyepiece tube and an objective tube. The eyepiece tube extends from the viewing end of the hood tube. An eye cup is connected to the eyepiece tube at an end of the eyepiece tube. The objective tube is fastened to the inside of the hood tube. An inner portion of the eyepiece tube is slidably disposed between the hood tube and the objective tube to provide for diopter adjustment.

The eyepiece tube and the objective tube generally define a lens housing of the device. An eyepiece lens is mounted within the eyepiece tube generally at the viewing end of the device. Three objective lenses are mounted within the objective tube generally opposite the eyepiece lens. A cushion may be disposed between two of the objective lenses. A diaphragm is disposed within the objective tube between the objective lenses and the eyepiece lens generally proximate the objective lenses.

The digital camera LCD screen hood may be made of a plastic material or other polymer, metal, or any other suitable material. The optical lenses of the eyepiece may be made of glass, plastic, or any other suitable materials for making lenses.

While the invention is particularly adapted for the afore described uses, it should be understood that as designed, or with changes apparent to those skilled in the art, the invention may be adapted for uses other than in the digital camera field which may fall within the scope of the appended claims. The invention may also be used to view images on a screen other than an LCD-type display.

These and other features and advantages of the invention will be more fully understood from the following description taken together with the accompanying drawings.

DETAILED DESCRIPTION OF THE INVENTION

Figure 1:
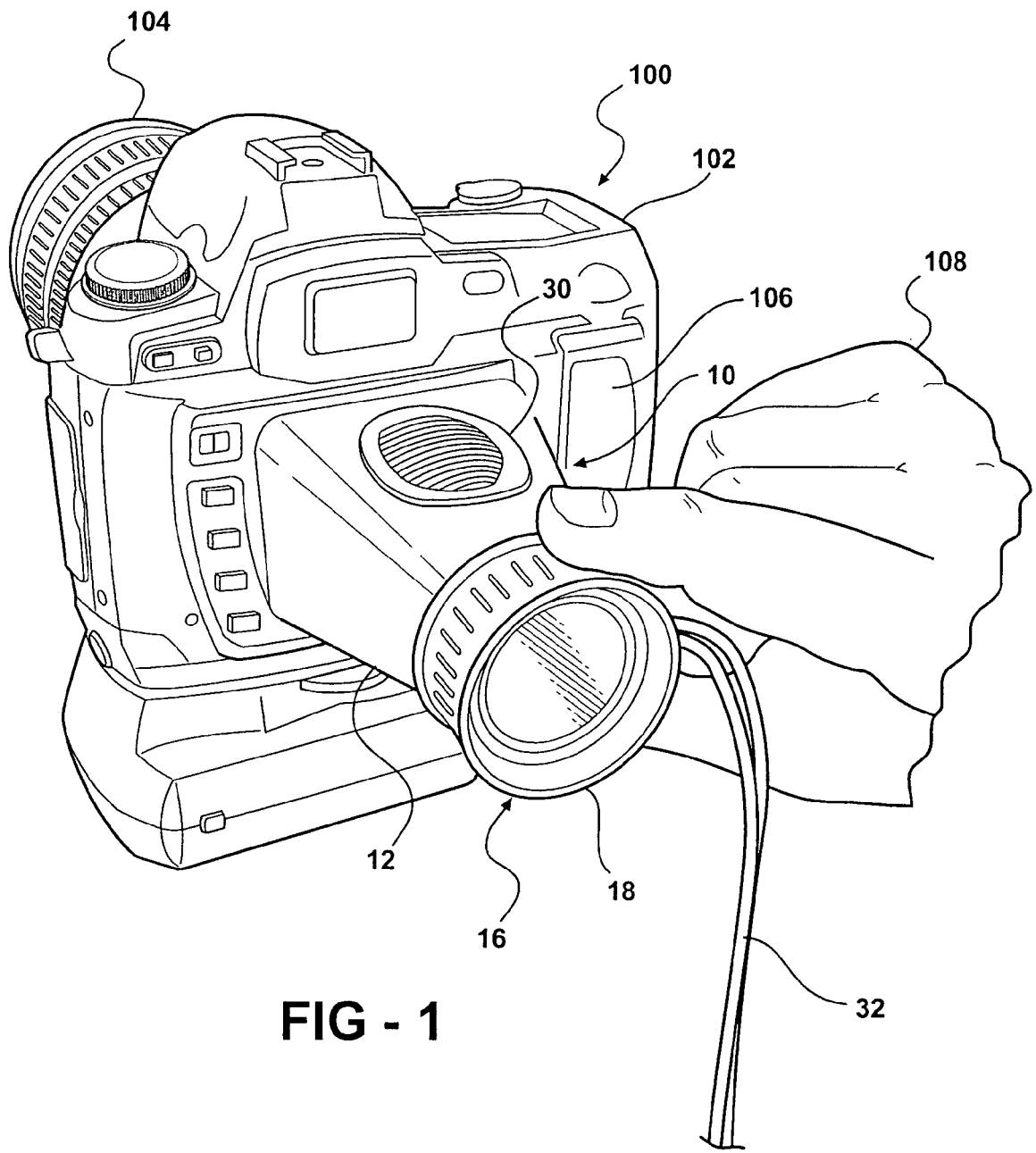
FIG. 1 is a pictorial view of a digital camera with an LCD screen hood in accordance with the invention being held by a user with a generally rectangular end against the camera back and covering the LCD screen.

Referring first to FIG. 1 of the drawings there is shown a pictorial view of an exemplary digital camera 100 of known construction having a body 102, a lens 104 mounted on the front, and a back 106 mounting an LCD view screen, not shown, but of known construction. Behind the camera, is shown a hand 108 of a user holding a light blocking hood 10 in the form of an LCD screen hood against the back 106 of the camera. The hood 10 is positioned so that it rests against the back 106 of the camera and covers the LCD screen, preventing the entry of ambient light into the hood 10 so that a user may view the screen and the images thereon clearly and free from external light. Hood 10 is an example of a light blocking hood in accordance with the present invention shown in use with a camera 100 for which the hood may be specifically designed.

Figure 2:
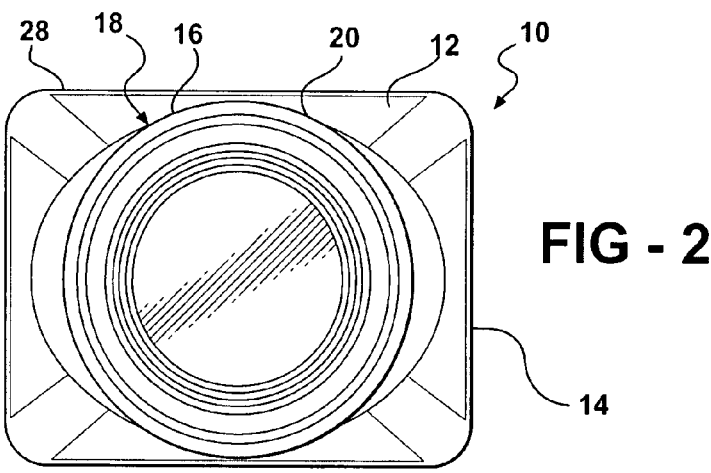
FIG. 2 is an end view of the hood of FIG. 1 seen from the viewing end of the hood.
Figure 3:
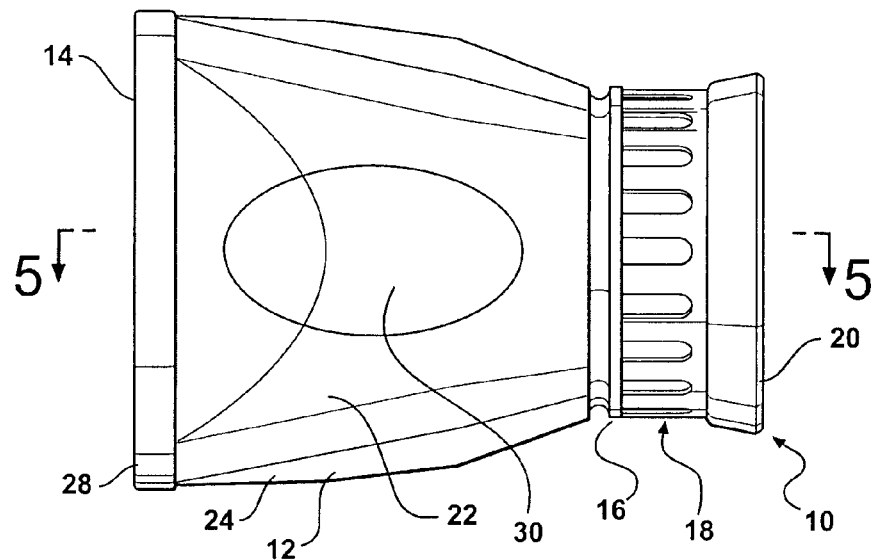
FIG. 3 is a wider side view of the hood.
Figure 4:
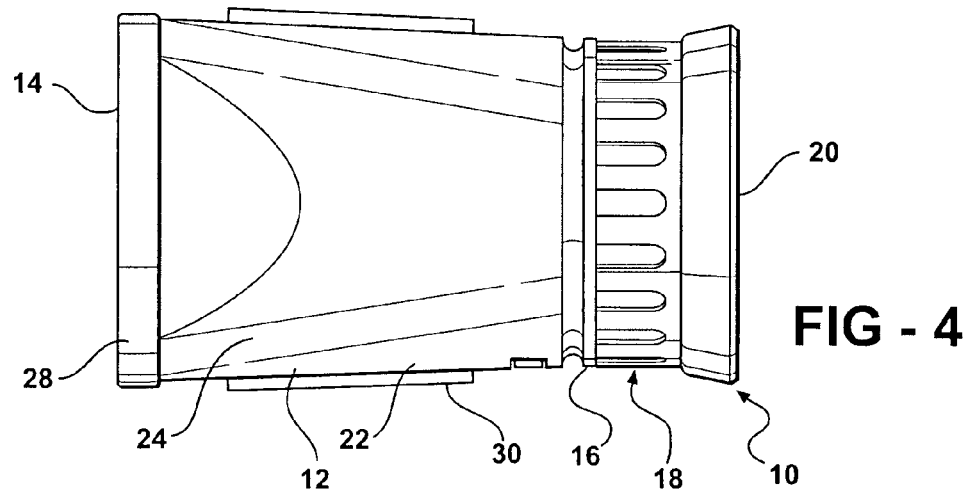
FIG. 4 is a narrower side view of the hood.

As shown in FIGS. 1 and 3, the hood 10 has a hood tube 12 with a generally rectangular camera end 14 that is open and, in use, engages the back 106 of the camera 100, enclosing the LCD screen. The hood tube 12 tapers inward to an opposite viewing end 16 on which an eyepiece 18, including an eye cup 20, is supported. FIGS. 2, 3 and 4 show exterior views from the viewing end 16, a wider side 22 and a narrower side 24, respectively.

Figure 5:
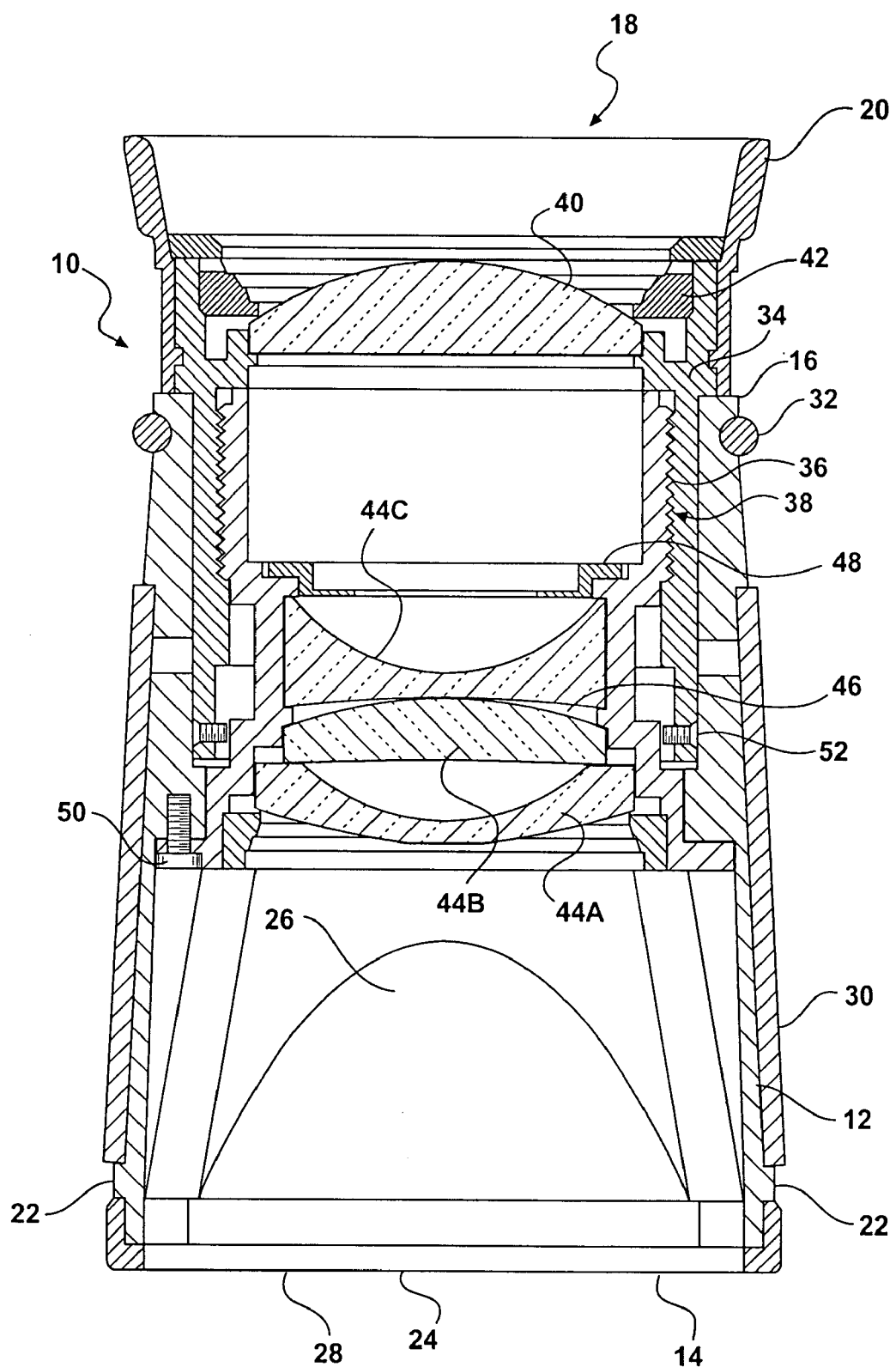
FIG. 5 is a detailed cross-sectional view of the hood taken through the line 5-5 of FIG. 3 and showing the major components of the hood.
Figure 6:
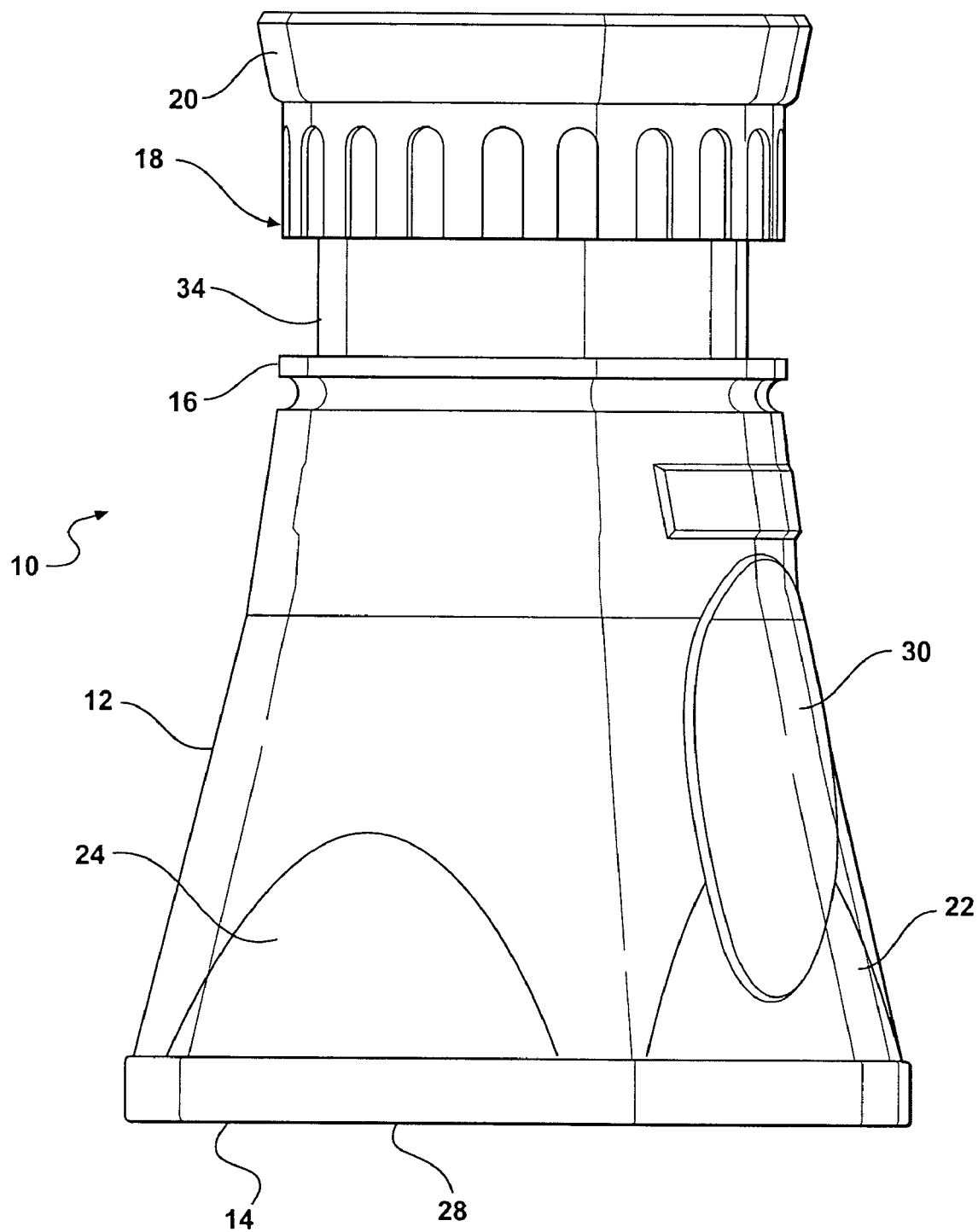
FIG. 6 is a pictorial view of the hood with the eyepiece raised to its extended position of diopter adjustment.

FIG. 5 is a detailed cross-sectional view of the hood 10 taken through the dashed centerline 5-5 of FIG. 3 and shows the major components of the hood 10. These include the hood tube 12 comprising an opaque exterior member of the hood 10 and defining an enclosed viewpath 26. A rubber cushion 28 may be connected to the periphery of the camera end 14 of the hood tube and one or more rubber grips 30 may be connected to outer surfaces of the hood tube 12. The rubber cushion 28 reduces the possibility of scratching the LCD screen and the rubber grips 30 aid a user in gripping and holding the hood 10. A lanyard 32 may also be connected to the outer surface of the hood tube 12 to allow a user to conveniently carry the hood 10.

The LCD screen hood 10 also includes an eyepiece tube 34 and an objective tube 36. The eyepiece tube 34 and the objective tube 36 generally define a lens housing 38 of the hood 10. An eyepiece lens 40 is mounted within the eyepiece tube 34 and secured therein by a fixture ring 42 generally at the viewing end of the hood 10. A group 44 of three objective lenses 44A, 44B, 44C, is mounted within the objective tube 36 generally opposite the eyepiece lens 40. A cushion 46 may be disposed between two of the objective lenses. A diaphragm 48 is disposed within the objective tube 36 between the objective lenses 44 and the eyepiece lens 40, generally proximate the objective lenses.

The objective tube 34 is fastened to the inside of the hood tube 12 by a fastener 50. An inner portion of the eyepiece tube 32 is slidably disposed between the hood tube 12 and the objective tube 34. The eye cup 20 is externally mounted to the upper end of the eyepiece tube 32 and is rotatable therewith to provide for diopter adjustment. For this purpose, the eyepiece tube 32 may be threadably connected with the objective tube 34 so that rotation of the eyepiece 18 will perform the adjustment by sliding the eyepiece tube in or out on the objective tube 34. An eyepiece fastener 52 limits motion of the eyepiece tube to maintain the tube assembly together.

In an alternative adjustment arrangement, the eyepiece tube 32 could be threadably connected to the hood tube 12 and would still be adjusted in and out by rotating the eyepiece 18.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An LCD screen hood for use with digital cameras, said hood comprising:
    a hood tube that generally defines a light blocking sidewall of the hood, the hood tube having an open camera end and an opposite viewing end and defining a longitudinally extending viewpath therebetween;
    an eyepiece mounted on the viewing end of the hood tube and including at least one eyepiece lens for enlarging an image on an associated LCD screen disposed at the viewing end of the hood tube;
    an eye cup mounted on the eyepiece for shielding the eyepiece lens from ambient light; and
    an objective lens fixed within the hood tube and spaced longitudinally between the eyepiece lens and the camera end of the hood tube, the eyepiece lens being longitudinally movable relative to the objective lens to provide diopter adjustment to accommodate user vision focus variations.

2. The hood of claim 1 wherein the eyepiece is adjustable to provide a plus or minus 3 diopter adjustment.

3. The hood of claim 1 wherein the eyepiece includes an eyepiece tube extending longitudinally within the hood tube from the eyepiece lens and eye cup toward the open camera end of the hood tube, the eyepiece tube being slidable within the hood tube and carrying the eyepiece lens and eye cup.

4. The hood of claim 3 including an objective tube fixed to the inside of the hood tube below the eyepiece tube, wherein the objective lens comprises a group of lenses mounted within the objective tube.

5. The hood of claim 4 wherein the objective lens group includes 3 longitudinally spaced lenses.

6. The hood of claim 5 wherein magnification of the assembled lenses is approximately 1.5×.

7. The hood of claim 6 wherein the overall length of the hood is not more than about 5 inches.

8. The hood of claim 1 wherein magnification of the at least one eyepiece lens is in the range of from 1× to 2.5×.

9. The hood of claim 6 including a diaphragm disposed within the objective tube between the objective lenses and the eyepiece lens.

10. The hood of claim 1 wherein a soft resilient material is mounted on the periphery of the camera end of the hood tube to protect against scratching of the LCD screen.

11. The hood of claim 10 wherein the exterior of the hood is provided with grip aids to assist the user in holding the hood in position while viewing the LCD screen.

12. The hood of claim 1 wherein the hood in use is hand-held about the LCD screen of an associated camera.

* * * * *